(12) United States Patent
Barrett

(10) Patent No.: US 6,487,811 B2
(45) Date of Patent: Dec. 3, 2002

(54) WATERFOWL DECOY WITH SELF-RETRACTING ANCHOR LINE

(76) Inventor: Kenneth J. Barrett, 108 Clinton St., Tallulah, LA (US) 71282

( * ) Notice: Subject to any disclaimer, the term of this patent is extended or adjusted under 35 U.S.C. 154(b) by 0 days.

(21) Appl. No.: 09/845,799

(22) Filed: Apr. 30, 2001

(65) Prior Publication Data

US 2002/0157299 A1 Oct. 31, 2002

(51) Int. Cl.⁷ .............................................. A01M 31/06
(52) U.S. Cl. ........................................... 43/3; 43/43.11
(58) Field of Search ............................. 43/3, 2, 43.11; 441/1, 6, 23–26, 28

(56) References Cited

U.S. PATENT DOCUMENTS

| | | | | |
|---|---|---|---|---|
| 1,789,649 A | * | 1/1931 | Gazecki et al. | 43/3 |
| 1,951,429 A | * | 3/1934 | Massie | 43/3 |
| 1,967,902 A | * | 7/1934 | Reichel | 43/3 |
| 2,177,697 A | * | 10/1939 | Fairbanks et al. | 43/43.11 |
| 2,539,727 A | * | 1/1951 | Clark | 43/3 |
| 2,678,778 A | * | 5/1954 | Gibson | 43/3 |
| 2,707,347 A | * | 5/1955 | Sneed | 43/43.11 |
| 2,747,814 A | * | 5/1956 | Taylor | 43/3 |
| 2,917,857 A | * | 12/1959 | Muszynski | 43/3 |
| 2,984,040 A | * | 5/1961 | Fogaley | 43/43.11 |
| 3,079,719 A | * | 3/1963 | Muszynski | 43/3 |
| 3,106,034 A | * | 10/1963 | Jonassen | 43/43.11 |
| 3,144,729 A | * | 8/1964 | Jonassen | 43/43.11 |
| 3,168,790 A | * | 2/1965 | Creasey | 43/43.11 |
| 3,169,339 A | * | 2/1965 | Ekstrand | 43/43.11 |
| 3,196,469 A | * | 7/1965 | Anthony | 441/25 |
| 3,214,858 A | * | 11/1965 | Louie | 43/43.11 |
| 3,375,603 A | * | 4/1968 | Loghry | 43/43.11 |
| 3,425,151 A | * | 2/1969 | Salfer | 43/43.11 |
| 3,878,634 A | * | 4/1975 | Quimpo | 43/43.11 |
| 3,977,115 A | * | 8/1976 | Check | 43/43.11 |
| 4,014,478 A | * | 3/1977 | Bonacina | 441/26 |
| 4,096,598 A | * | 6/1978 | Mason | 441/25 |
| 4,195,380 A | * | 4/1980 | Higgs | 441/26 |
| 4,251,941 A | * | 2/1981 | Howard | 43/43.11 |
| 4,340,192 A | * | 7/1982 | Burris, III | 43/3 |
| 4,674,219 A | | 6/1987 | Chargo et al. | |
| 4,757,630 A | | 7/1988 | Torberg | |
| 4,825,580 A | * | 5/1989 | Gray | 43/43.11 |
| 4,826,099 A | | 5/1989 | Johnson | |
| 4,827,653 A | * | 5/1989 | Sewell | 43/3 |
| 5,256,093 A | * | 10/1993 | Balstad | 441/25 |
| D348,716 S | | 7/1994 | Sbrocchi | |
| 5,367,813 A | * | 11/1994 | Cherry | 43/3 |
| 5,449,308 A | * | 9/1995 | Thompson | 441/26 |
| D394,895 S | | 6/1998 | Moody | |
| 5,893,230 A | | 4/1999 | Koltoniak | |
| 5,941,008 A | | 8/1999 | Schmidt et al. | |
| 5,947,780 A | * | 9/1999 | Kellner et al. | 441/26 |
| 6,086,439 A | * | 7/2000 | Vasile | 441/28 |

FOREIGN PATENT DOCUMENTS

| | | | | |
|---|---|---|---|---|
| FR | 465894 B1 | * | 4/1914 | 43/43.11 |
| IT | 686252 B1 | * | 3/1965 | 43/3 |
| SE | 121221 B1 | * | 3/1948 | 43/43.11 |

* cited by examiner

*Primary Examiner*—Darren W. Ark
(74) *Attorney, Agent, or Firm*—Akin, Gump, Strauss, Hauer and Feld, L.L.P.

(57) ABSTRACT

A waterfowl decoy with a self-retracting anchor line includes a body defining a closed interior space in which is disposed a spring biased anchor line reel. An anchor line is wound on the reel and trained out of the body through a port in the breast of the body. A spring biased manually actuatable lock member is disposed in a bore formed in the body at the breast and includes a passage through which the anchor line is trained and normally snubbed between the lock member and the decoy body. The anchor line may be paid out off of the reel through the lock member and the port in the breast of the decoy above the normal waterline of the decoy body and connected to an anchor. The anchor line is retrieved and retracted by digitally actuating the lock member to release the line for retraction by the spring biased reel.

15 Claims, 3 Drawing Sheets

WATERFOWL DECOY WITH SELF-RETRACTING ANCHOR LINE

FIELD OF THE INVENTION

The present invention pertains to a waterfowl decoy with a self-retracting anchor line and a manually actuatable snubber or lock mechanism for setting the line length or scope.

BACKGROUND

There have been previous developments in providing waterfowl decoys with self-retracting anchor lines wherein the anchor line is wound on a spring biased reel disposed in or attached to the decoy body. Although prior art decoys have been provided with self-retracting anchor lines, there has been a desire to provide improvements in such decoys wherein the length of the working part of the anchor line may be easily adjusted. Still further, there has been a desire to provide a waterfowl decoy with a self-retracting anchor line wherein the anchor line is attached to the decoy in a position which allows the decoy to face into the wind or "weathervane" and to minimize the chance of leakage of water into the decoy body. In this last mentioned regard, improvements in decoys with reel-type line storage mechanisms have been sought wherein the mechanism does not require to be immersed in water or be fastened to the decoy body with any through-the-body fasteners or fittings. It is to these ends that the present invention has been developed.

SUMMARY OF THE INVENTION

The present invention provides an improved waterfowl decoy with a self-retracting anchor line.

In accordance with one aspect of the invention, a waterfowl decoy is provided with a self-retracting anchor line and a spring biased snubber or lock mechanism for setting the anchor line length. The spring biased snubber is preferably built into the decoy body in the chest area, is easily manually actuated to release the line for payout or retraction and is positioned such that the anchor line extends through a port above the waterline. The anchor line extension port may be located in one of various parts of the decoy body and in one preferred embodiment the line extension port is located in the chest of the decoy body so that, when the decoy is anchored, the decoy "weathervanes" or faces into the wind to minimize becoming tangled with other decoys anchored nearby.

The present invention still further provides a waterfowl decoy with an improved arrangement of mounting a retractable anchor line reel within the body of the decoy. The decoy is provided with a self-retracting anchor line which is stored on a spring-biased reel mounted in the decoy body and fastened to the body internally to eliminate any "through-hull" fittings or fasteners. Accordingly, the reel mechanism remains essentially dry under all operating conditions.

Those skilled in the art will further appreciate the advantages and superior features of the invention, together with other important aspects thereof upon reading the detailed description which follows in conjunction with the drawing.

DETAILED DESCRIPTION OF A PREFERRED EMBODIMENT

Figure 1:
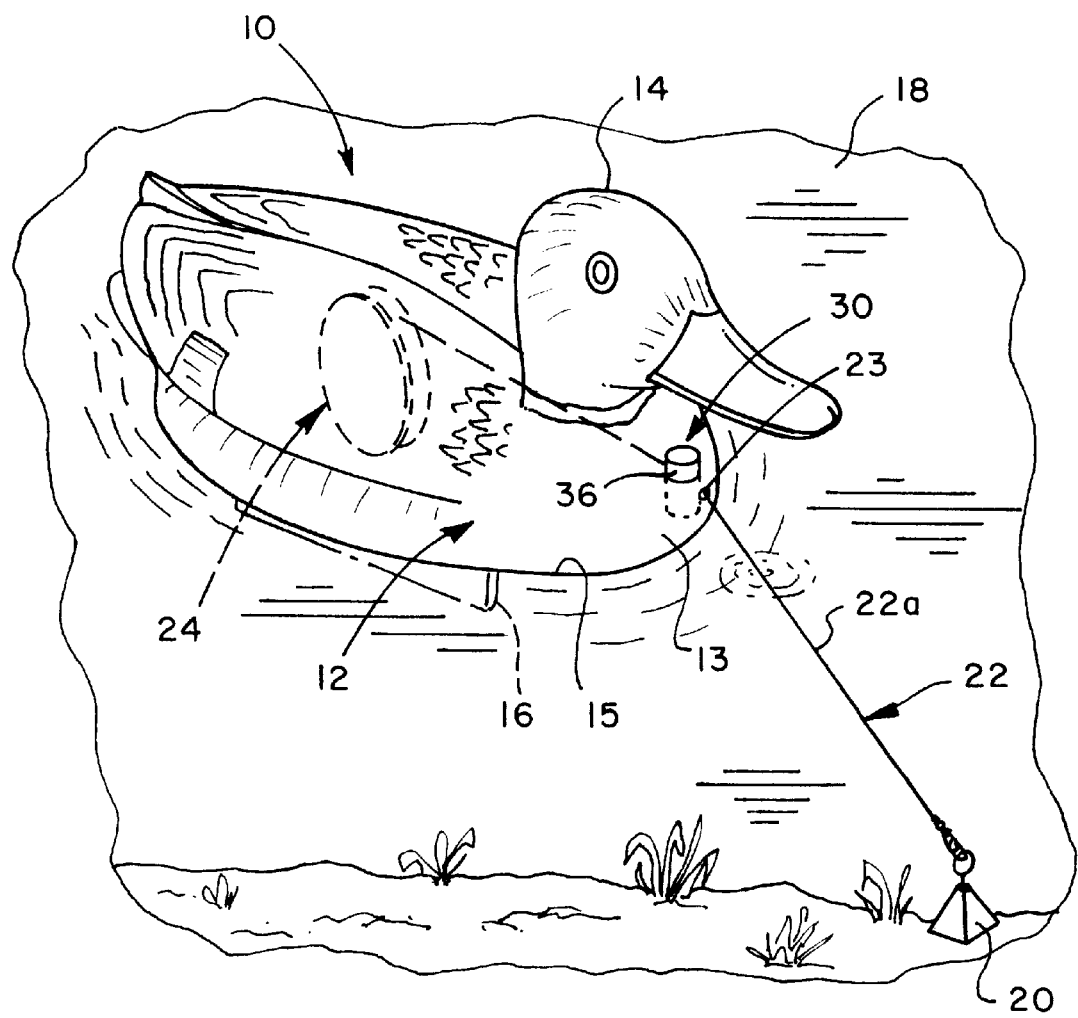
FIG. 1 is a perspective view of the waterfowl decoy of the present invention in a working position with its anchor line extended.

In the description which follows, like parts are marked throughout the specification and drawing with the same reference numerals, respectively. The drawing figures are not necessarily to scale in the interest of clarity and conciseness.

Referring to FIG. 1, a waterfowl decoy in accordance with the invention is illustrated and generally designated by the numeral 10. The decoy 10 includes a buoyant, preferably hollow, body 12, a head 14 and an integral ballasted keel 16 for assisting in maintaining the decoy floating on a body of water 18 in an upright and decoy-like position. The decoy 10 is characterized as a migratory waterfowl, such as a duck. However, other types of waterfowl decoys may enjoy the benefits of the invention.

The decoy 10 is shown anchored in position in the body of water 18 by a suitable anchor 20 connected to an elongated flexible anchor line 22 which is connected at one end to the anchor and is trained through a suitable port 23 in the chest 13 of the decoy body, which port is disposed above the waterline 15 of the decoy body. Anchor line 22 is partially wound on a spring biased reel 24 disposed within body 12 and which will be described in further detail herein. The port 23 may be located elsewhere on the body 12 and the reel 24 oriented accordingly whereby several different decoys, similar to the decoy 10, may ride on a body of water in selected headings with respect to wind direction.

The working length of the anchor line 22 between the port 23 in the chest 13 and the anchor 20 is selected by pulling the line off of reel 24 and controlling the length of payout of the line by a snubber or lock mechanism, generally indicated by numeral 30 in FIG. 1. The snubber or lock mechanism 30 is operable to secure the length of anchor line 22a between the port 23 and the anchor 20 in accordance with the depth of the body of water 18 and the amount of scope desired to allow the decoy 10 to float in a decoy-like manner. By placing the point of attachment of the working part 22a of the anchor line 22 at the forwardmost part of the chest 13 of the body 12, the decoy 10 will also weathervane suitably and point into the wind when anchored. This is useful and desirable when the decoy 10 is deployed with other decoys having similar retractable anchor line arrangements so as to avoid anchor lines of adjacent decoys becoming tangled. However, as mentioned above, the point of attachment of the anchor line to the decoy body may be otherwise and as determined by the position of the port 23.

Figure 2:
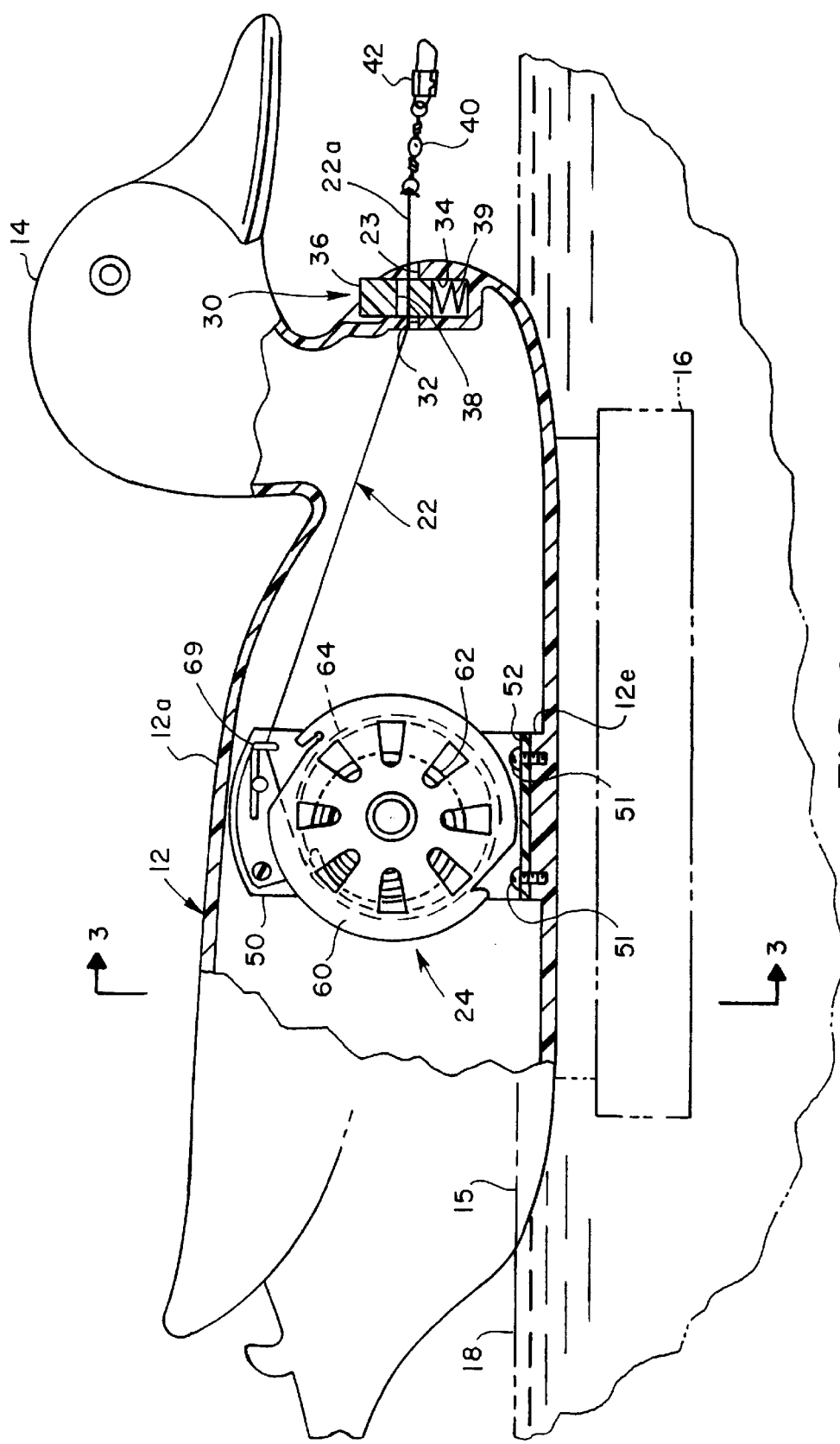
FIG. 2 is a longitudinal central section view of the decoy shown in FIG. 1 taken generally along line 2—2 of FIG. 3.
Figure 3:
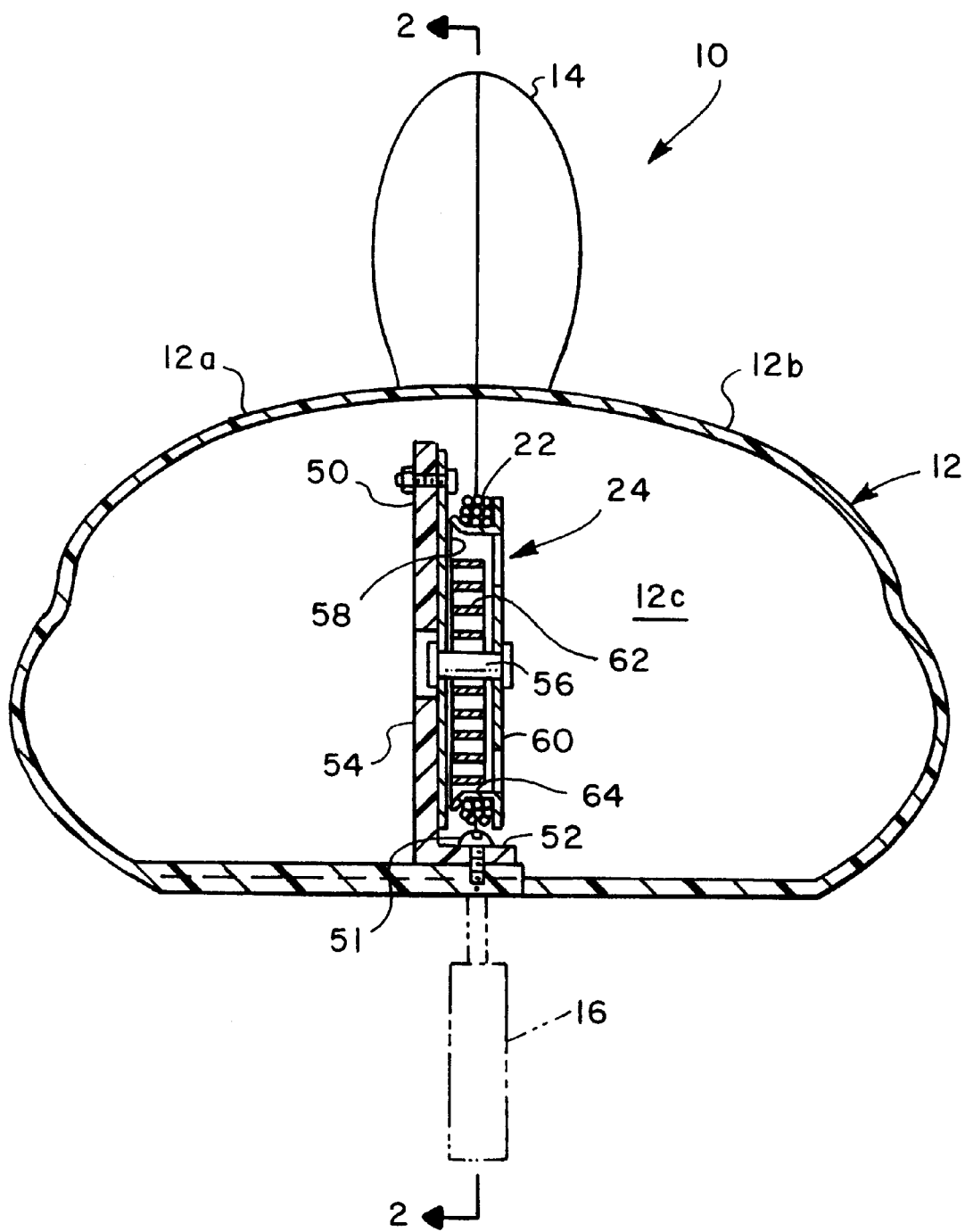
FIG. 3 is a section view taken generally along the line 3—3 of FIG. 2.

Referring now to FIG. 2, in particular, the decoy 10 is shown in partial longitudinal central section view taken generally along the line 2—2 of FIG. 3. As shown in FIG. 2, the forward part of the body 12 or chest 13 is provided with port 23 well above the normal waterline 15 of the decoy 10 and disposed forward on the body 12 advantageously. The snubber or lock mechanism 30 is characterized by a generally cylindrical bore 34 formed in the body 12 and projecting upwardly under the head 14.

A generally cylindrical manually actuatable snubber or lock member 36 is slidably disposed in the bore 34 and includes a passage 38 extending transversely therethrough, normal to the axis of the bore 34 and alignable with the port 23 and with a port 32 in body 12 to allow the anchor line 22 to be reeled in or paid out when the lock member 36 is biased downwardly, viewing FIG. 2, from the position shown. A suitable coil spring 39 is disposed in bore 34 and engaged with member 36 to bias the member upwardly to pinch the line 22 between the member 36 and the sidewalls of the ports 23 and 32 in the body 12. As shown in FIG. 2, the distal end of anchor line 22 is preferably connected to a suitable swivel member 40, not unlike a fishing line swivel, and which is connected to a suitable hook 42 for releasably connecting the anchor line 22 to the anchor 20.

Referring to FIGS. 2 and 3, the hollow body 12 may be formed of opposed shell-like, substantially mirror image body parts 12a and 12b, FIG. 3, which may be molded out of a suitable plastic, for example. The body parts 12a and 12b may be suitably secured together to form a substantially watertight interior space 12c in which the reel 24 is mounted. Space 12c may also be occupied with an expanded polymer foam material, or the like, except for a suitable cavity required for reel 24 and a passage for anchor line 22.

Referring further to FIGS. 2 and 3, the reel 24 is characterized by a somewhat angle or L-shaped support member 50 having a base 52 and an upstanding part 54 on which the reel 24 is rotatably mounted. The reel 24 includes a stationary axle 56 secured to a stationary flange or plate 58 and a reel member 60 rotatably mounted on the axle. A torsion coil spring 62 is fixed at one end to the axle 56 and at its opposite end to an outer hub 64 of the reel member 60. The anchor line 22 is wound on the outer hub 64 of reel member 60 and suitably secured thereto. Anchor line 22 is preferably trained through a suitable fairlead 69, FIG. 2, to assist in reeling and dereeling the line with respect to the reel 24. As shown in FIGS. 2 and 3, the support 50 is suitably secured to the body shell part 12a by conventional threaded fasteners 51. However, the fasteners 51 are threadedly engaged with the body shell part 12a at an integrally formed boss 12e, FIG. 2, and are secured to the boss from the inside space 12c before the body parts 12a and 12b are assembled to each other so that no "through-hull" penetrations are required for the decoy body 12 below waterline 15. Alternatively, the support member 50 could be integrally formed with body part 12a or attached thereto by other means.

The construction and operation of the decoy 10 is believed to be understandable to those of ordinary skill in the art based on the foregoing description. The body 12 may be molded of a suitable plastic or other materials in opposed shell parts 12a and 12b. The reel 24 may be constructed of conventional materials for retractable or self-retracting reels for various types of flexible line applications. Moreover, the parts of the line snubber or lock 30 may also be formed of conventional engineering materials. The line 22 and the swivel and swivel hook 40, 42 may be constructed of conventional engineering materials including, for the line 22, twisted polymer, such as Nylon.

When it is desired to deploy the decoy 10, the movable lock member 36 is depressed and the line 22 is pulled out through the ports 32 and 23 and dereeled from reel 24, against the bias of spring 62, to the desired length and preferably after being connected at the hook 42 to an anchor 20. Once the requisite line length is pulled out, the lock member 36 is released and the coil spring 38 biases the lock member in an upward direction, viewing FIG. 2, to pinch the line 22 between the lock member 36 and the body 12 at the ports 23 and 32. In this way the requisite line length is provided for suitably anchoring the decoy on a body of water, such as the body 18. When it is desired to retrieve the decoy and store the line 22, the anchor 20 may or may not be removed from the hook 42 and the lock member 36 depressed to release the line for self-retraction by the reel 24 under the urging of the coil spring 62.

Although a preferred embodiment of a waterfowl decoy with a self-retracting anchor line has been described herein, those skilled in the art will recognize that various substitutions and modifications may be made without departing from the scope and spirit of the appended claims.

What is claimed is:

1. A waterfowl decoy comprising:
 a buoyant body resembling a waterfowl, including a bottom portion, a chest portion extending generally upwardly from the bottom portion, a neck portion extending generally upwardly from the chest portion, and a head portion connected to an upper end of the neck portion, wherein the bottom portion extends generally rearwardly from a forward end of the chest portion, the chest portion together with the bottom portion forming a hollow interior;
 a spring biased flexible line retracting and payout reel mounted on said body in the hollow interior at a position spaced from the forward end of the chest portion;
 a flexible line receiving port in the forward end of said chest portion;
 a flexible anchor line wound on said reel and trained through said port so that the decoy will weathervane when anchored by the flexible anchor line; and
 a manually releasable lock member extending from the forward end of said chest portion and spaced from said reel, said manually releasable lock member being directly engaged with said line when in a locked position to hold a predetermined length of line paid out of said reel against movement for anchoring said decoy in a body of water.

2. The decoy set forth in claim 1 wherein:
 said reel is fastened to said body from an inside surface thereof to eliminate through-hull openings in said body for anchoring said reel.

3. The decoy set forth in claim 1 wherein:
 said lock member includes a digitally actuatable member slidably disposed in a bore in said chest portion.

4. The decoy set forth in claim 3 wherein;
 said digitally actuatable member includes a passage herein alignable with said port, said anchor line being trained through said passage.

5. The decoy set forth in claim 4 including:
 a first spring operably associated with said digitally actuatable member for biasing said digitally actuatable member in a direction to pinch said anchor line between said digitally actuatable member and said chest portion.

6. The decoy set forth in claim 5, and further comprising a second spring operably associated with said reel for biasing said reel in a line retracting direction.

7. The decoy set forth in claim 3 wherein:
 said lock member is disposed at said chest portion of said decoy.

8. The decoy set forth in claim 1 wherein:
 said reel is disposed in the hollow interior which is substantially watertight.

9. The decoy set forth in claim 1 wherein:
 said port is disposed above the waterline of said body when said decoy is disposed upright on a body of water.

10. A waterfowl decoy comprising:
 a buoyant body resembling a waterfowl, including a bottom portion, a chest portion extending generally upwardly from the bottom portion, a neck portion extending generally upwardly from the chest portion, and a head portion connected to an upper end of the neck portion, wherein the bottom portion extends generally rearwardly from a forward end of the chest portion, the chest portion together with the bottom portion forming a hollow interior;

a flexible line retracting and payout reel mounted in said body in the hollow interior at a position spaced from the forward end of the chest portion;

a flexible line receiving port in the forward end of said chest portion;

a flexible anchor line wound on said reel and trained through said port so that the decoy will weathervane when anchored by the flexible anchor line; and a lock member extending from the forward end of the chest portion and spaced from said reel and directly engageable with said line to hold a predetermined length of line paid out of said reel for anchoring said decoy in a body of water, said lock member including a digitally actuatable member slidably disposed in a bore in said chest portion, a passage in said digitally actuatable member being alignable with said port for receiving said anchor line therein, and a first spring for biasing said digitally actuatable member in a direction to pinch said anchor line between said digitally actuatable member and said chest portion.

11. The decoy set forth in claim 10 wherein:
said reel is disposed in the hollow interior which is substantially watertight.

12. The decoy set forth in claim 10 wherein:
said port is disposed above the waterline of said body when said decoy is disposed upright on a body of water.

13. The decoy set forth in claim 10, and further comprising a second spring operably associated with said reel for biasing said reel in a line retracting direction.

14. A waterfowl decoy comprising:

a buoyant body resembling a waterfowl, including a bottom portion, a chest portion extending generally upwardly from the bottom portion, a neck portion extending generally upwardly from the chest portion, and a head portion connected to an upper end of the neck portion, wherein the bottom portion extends generally rearwardly from a forward end of the chest portion, the chest portion together with the bottom portion forming a substantially watertight hollow interior;

a flexible line retracting and payout reel mounted in the hollow interior;

a flexible line receiving port disposed in said chest portion of said body above the waterline of said body when said decoy is disposed upright on a body of water;

a flexible anchor line wound on said reel and trained through said port, and a lock member extending from the forward end of the chest portion and spaced from said reel and directly engageable with said line to hold a predetermined length of line paid out of said reel for anchoring said decoy in a body of water, said lock member including a digitally actuatable member slidably disposed in a bore in said chest portion, a passage in said digitally actuatable member being alignable with said port for receiving said line therein, and a first spring for biasing said digitally actuatable member in a direction to pinch said line between said digitally actuatable member and said chest portion.

15. The decoy set forth in claim 14, and further comprising a second spring operably associated with said reel for biasing said reel in a line retracting direction.

* * * * *